United States Patent [19]
Turner

[11] 3,782,411
[45] Jan. 1, 1974

[54] DUCT ACCESS SECTION

[75] Inventor: Lloyd Bowman Turner, Columbus, Ohio

[73] Assignee: United McGill Corporation, Columbia, Ohio

[22] Filed: June 30, 1972

[21] Appl. No.: 267,990

[52] U.S. Cl.................. 137/467, 137/526, 137/559
[51] Int. Cl............................................. F16k 17/04
[58] Field of Search................. 137/357, 358, 467, 137/469, 526, 551, 559; 138/92; 220/24 H, 55.3

[56] References Cited
UNITED STATES PATENTS

| | | |
|---|---|---|
| 2,452,612 | 11/1948 | Swenberg........................ 137/526 X |
| 3,189,042 | 6/1965 | Kerley et al. .................... 137/526 X |
| 3,340,890 | 9/1967 | Raskhodoff..................... 137/559 X |
| 1,856,881 | 5/1932 | Moss................................ 220/24 H |
| 2,506,737 | 5/1950 | Paquin............................. 137/469 |

*Primary Examiner*—Alan Cohan
*Assistant Examiner*—Gerald A. Michalsky
*Attorney*—William A. Strauch et al.

[57] ABSTRACT

A combination duct access section which, installed in a duct, provides the duct with an access opening, a transparent inspection door, and/or a vacuum relief valve.

20 Claims, 5 Drawing Figures

DUCT ACCESS SECTION

BACKGROUND OF THE INVENTION

This invention relates generally to an access section for an air duct, and more particularly to a novel access section which can be installed in a high velocity air duct section immediately downstream of a fire damper which operates under predetermined conditions to obstruct air flow through the duct.

In a high velocity air duct system, a fire damper of the type, for example, shown in U.S. Pat. Nos. 3,467,163 and 3,485,284, is usually provided for safety reasons in the air duct between the air blower and air outlets. The fire damper is maintained in a normal open position to permit air flow through the duct, but is closed to prevent passage of fire as well as obstruct air flow when an excessively high temperature creates an emergency condition within the duct and area receiving the air.

Industry regulations require that a fire damper be inspected and test operated at regular intervals to ensure that it will operate when needed in time of emergency. Thus, some arrangement must be provided for permitting access to the damper for periodic inspection and/or testing, or for enabling resetting of the damper in case it should be somehow accidentally actuated to a closed position.

In such a high velocity air duct system employing a fire damper, as the fire damper is slammed shut, the inertia of the rapidly moving column of air downstream of the damper develops a substantial vacuum in the duct immediately downstream of the suddenly closed damper. That vacuum is capable of collapsing and damaging the ductwork. When this occurs, a considerable amount of time and expense are required to repair the ductwork and place the overall system back into operation.

With these requirements and problems in mind, development work was initiated to provide an arrangement which would not only satisfy industry requirements for inspection and maintenance, but would also afford a solution to the problem of ductwork collapse upon rapid closure of the fire damper.

SUMMARY OF THE INVENTION

Accordingly, the primary object of this invention resides in the provision of a novel duct access section which affords quick and easy accessibility into a duct, permits visual inspection of the interior of the duct, and/or provides vacuum relief at a safe negative pressure to prevent duct collapse.

Another object of this invention resides in the provision of a novel duct access section which provides a duct with an access opening, a transparent inspection door, and/or a vacuum relief valve.

Another object of the invention resides in the provision of a novel duct access section of simple construction which performs the three essential functions of inspection, maintenance accessibility, and vacuum relief protection in a high velocity air duct system of the type described above.

Still another object of the invention resides in the provision of a novel, combination access section for use in a duct system immediately downstream a fire damper unit, with the access section providing ready access to and inspection of the fire damper and also providing a vacuum relief valve for the duct to prevent its collapse upon rapid closure of the fire damper.

A further object of the invention resides in the provision of a novel access section for a duct, the section including a transparent cover or door mounted on the side wall of the duct by a plurality of releasable, spring lock members which enable the cover to be displaced inwardly into the duct by hand to provide an access opening, or automatically in response to a predetermined, safe vacuum or negative pressure within the duct. The transparent, releasable door affords quick visual inspection of the interior of the duct and/or fire damper located therein, provides a quick and easy access opening to the interior of the duct when necessary, and acts as a vacuum relief valve to prevent the collapse of the duct under emergency negative pressure conditions.

Other objects and advantages of the invention will become apparent from reading the following detailed description of a preferred embodiment of the invention, wherein reference is made to the accompanying drawings in which like elements are indicated by like numerals.

DETAILED DESCRIPTION OF THE INVENTION

Figure 1:
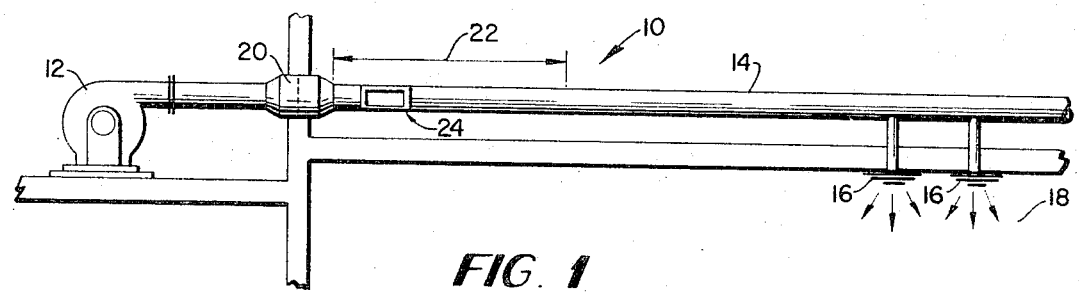
FIG. 1 is a fragmentary, schematic illustration of a high velocity air duct system in which the novel access section of the invention is particularly useful.
Figure 3A:
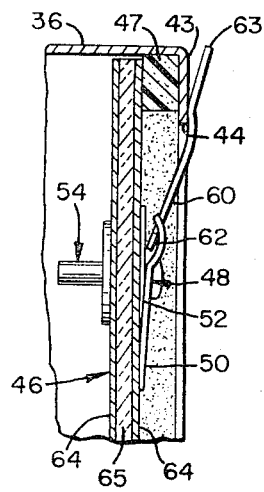
FIG. 3A is a fragmentary sectional view similar to FIG. 3 illustrating an insulated access door provided for gas flow systems and fluid ducts which are required to be insulated.

As shown in FIG. 1 of the drawings, a high velocity air duct system 10 includes a fan or blower 12 which delivers pressurized air to a sheet metal distributing duct 14 having branched outlets 16 which lead into a room or other area 18 to which air is to be supplied. A fire damper unit 20 is connected between fan 12 and duct 14 and is usually in an open position to permit air flow through duct 14. Under emergency conditions, the damper 20 is actuated to a closed position to obstruct air flow between the fan 12 and duct 14 and to prevent passage of fire past the damper.

As discussed above, area 22 of duct 14 immediately downstream of fire damper unit 20 is subject to inward collapse following rapid closure of the fire damper. This results from the creation of a negative pressure in area 22 by the inertia of the column of air which is moving rapidly through duct 14. In accordance with this invention, a novel, combination duct access and vacuum relief section 24 is inserted in duct system 10 between the downstream end of fire damper unit 20 and duct 14.

Figure 2:
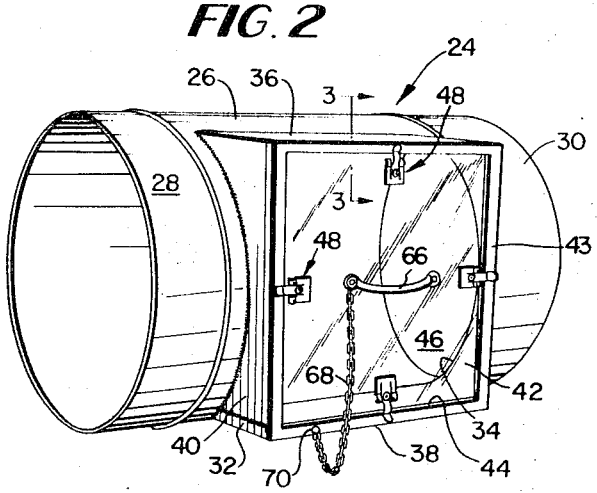
FIG. 2 is a perspective view of a novel duct access section constructed according to the invention.
Figure 3:
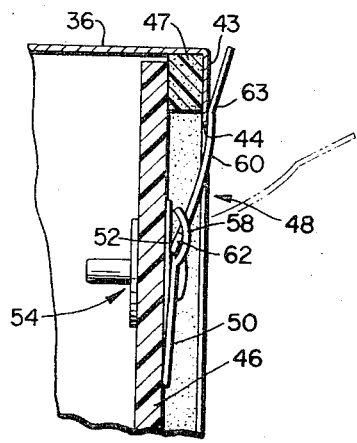
FIG. 3 is a fragmentary sectional view taken generally along lines 3—3 of FIG. 2, illustrating in particular the manner in which the releasable lock members mount the transparent door on the door frame.
Figure 4:
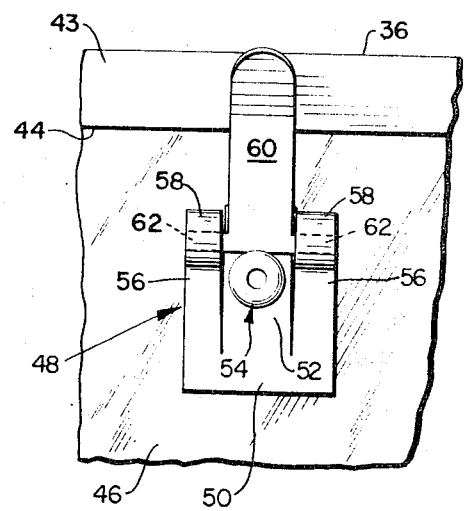
FIG. 4 is a fragmentary front view illustrating the releasable lock members.

Referring now to FIGS. 2–4, access section 24 includes a tubular, sheet metal fitting 26, one end 28 to be connected to a duct downstream of, or directly to the downstream end of, fire damper unit 20 and another end 30 to be connected to duct 14. A sheet metal, door housing 32, having a generally rectangular cross section, is fastened as by welding, about an opening 34 in the side wall of fitting 26. Housing 32 may, for example, be formed by upper and lower wall plates 36 and 38 of about 12 inches or more long and side wall plates 40 and 42 of about 8 inches or more long. The inner edges of plates 36, 38, 40, and 42, conform to the shape of the wall of fitting 26 so that all of the plates may be welded against fitting 26. The outer ends of the plates are bent inwardly to provide a small, rectangular door frame 43 which surrounds a rectangular access opening 44 into housing 32 and fitting 26.

A transparent, shatterproof door 46, made from a plastic or similar material, is releasably mounted inside of the frame 43 against a sealing gasket 47 which is made of rubber or the like and extends completely around the inside surface of frame 43. The mounting structure includes a plurality of releasable spring lock members 48. Door 46, also serving as a visual inspection port, is sized somewhat smaller than the rectangular cross sectional area of housing 32 so that the door may be displaced inwardly through the housing into the fluid passageway of fitting 26.

As shown in FIGS. 3 and 4, each of the releasable spring lock members 48 is of a commercially available type and includes a body portion 50 having a center section 52 which is fastened against the outer surface of door 46 by way of a pop rivet assembly 54. The body portion 50 also includes a pair of spring arms 56, the free ends of which are formed as arcuate pivoting bearing surfaces 58. A locking lever or finger 60 includes a pair of laterally extending pivot arms 62 of rectangular cross section mounted within bearing sections 58 of spring arms 56, with the free end 63 of finger 60 adapted to engage the outer surface of frame 43 in the locked position of the lock member 48 as shown in full line in FIG. 3.

With the lock members 48 positioned as shown in FIG. 3, door 46 is locked in place inside housing 32 against gasket 47 by the spring force of spring arms 56. It is maintained in this locked closed position to block access opening 44 until a sufficient inward force is applied against the door to overcome arms 56 and move fingers 60 to the unlocked dotted line position of FIG. 3.

To facilitate manual displacement of door 46 inwardly through housing 32 into fitting 26, a handle 66 is fastened to door 46. A flexible retaining chain 68 has one end connected to handle 66 and its other end welded at 70 to door frame 43 to retain door 46 within the access section after it has been opened.

It is apparent that the duct access section 24 provides the objects and advantages which were set forth and discussed initially hereinabove. For example, with the transparent door 46 retained in place as shown in FIG. 2, a visual inspection through door 46 of the fire damper unit 20 in the system shown in FIG. 1 is readily feasible without necessitating the removal or disturbance of any parts or shut down and interruption of the system. When it becomes necessary to physically inspect, test-operate, or reset fire damper unit 20, maintenance personnel need only to push inwardly on handle 66 to release lock fingers 60 to the dotted line position shown in FIG. 3, and thereafter displace the entire door 46 into the main flow passageway of fitting 26. Access to the fire damper unit 20 is thereby provided through the access openings 44, 42 and 34, and, when the required maintenance or inspection is completed, door 46 is quickly and easily returned to its closed position simply by relocking fingers 60 against the outside surface of door frame 43.

During operation of air flow system 10, access system 24 prevents collapse of and damage to duct area 22 immediately following rapid closure of the fire damper unit 20. As discussed previously, when the fire damper unit 20 rapidly closes it can block the air flow from fan 12 and the inertia of the rapidly moving column of air in duct 14 causes a vacuum or negative pressure to be developed in section 22 of the duct system. This negative pressure will act against the inside surface of door 46 and, when it is sufficiently high to overcome the spring force of arms 56, fingers 60 will be unlocked automatically and door 46 will be pulled inwardly into fitting 26, thereby providing a vacuum relief passage through access openings 44, 42 and 34. In this way, door 46 and lock members 48 can be designed to open at a safe negative pressure and the door will act as a vacuum relief valve for the overall duct system to effectively prevent collapse of and damage to the ductwork.

The safe negative pressure required to overcome the spring force of arms 56 to release door 46 may vary with various sized ductwork, but, of course, in all cases it will be less than that at which collapse of the ductwork will occur. For example, the negative pressure at which door 46 will open may lie within a range of 3½ inches to 7½ inches water column. After door 46 has been opened and operated as a relief valve, tether chain 68 retains the door in the area of fitting 26 and prevents it from moving downstream into duct 14.

It will be apparent that during normal operation of system 10 the pressurized air flowing through fitting 26 forces door 46 outwardly against gasket 47 to provide a tight pressure seal around the door frame opening 44 and prevent any leakage of air through opening 44.

Various modifications of access section 24 may be made without departing from the scope of the invention. For example, door 46 may be constructed of solid sheet metal, or it may be an insulated door consisting of a double wall of sheet metal 64 with an intermediate layer of insulation 65. In addition, the entire access section 24 may be fully insulated and incorporated in acoustical ductwork.

Although the access section 24 has been described for particular use in combination with a fire damper, it is, of course, not limited to such a use and may be employed in any ductwork to provide ready access into and/or vacuum relief for the ductwork.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A gas flow system comprising: a pressurized gas source; gas outlet means; duct means for conveying gas from said source to said outlet means; damper means mounted in said duct means for movement between a normally open position in which it permits gas flow through said duct means and a closed position in which it obstructs flow through said duct means; and means providing access to said damper means through an opening in the wall of said duct means downstream of said damper means and including a closure member sealingly fitted to said wall opening and mounted on said duct means by resettable latch means normally biasing said closure member to seal said wall opening and actuated in response to a negative pressure in said duct means to release said closure member from its mounting on said duct means and provide vacuum relief for said duct means.

2. The gas flow system of claim 1 wherein said closure member comprises a transparent, shatterproof door serving also to provide a visual inspection port for viewing said damper means.

3. The gas flow system of claim 1 wherein said resettable latch means comprises spring biased pressure releasable latch means operative to release said closure member from said duct means in response to an effective inward pressure on said closure member.

4. The gas flow system defined in claim 3, said access means comprising a tether chain connecting said closure member to said duct means adjacent said opening.

5. The gas flow system defined in claim 1, said closure member comprising a door comprising spaced metal walls and a layer of insulation therebetween.

6. The gas flow system of claim 1, wherein a tether chain is provided having one end connected to said closure member and its other end connected to said duct means to retain the released closure member within the access section of said duct means upon its release in response to releasing pressure.

7. The gas flow system defined in claim 1, wherein said access means comprises a tubular housing fixed to the wall of said duct means defining said opening and projecting laterally therefrom, the outer end of said housing having an inwardly directed framing fixed thereto defining an opening communicating with said opening in the wall of said duct means, and sealing means mounted on said framing inside said housing, said closure member being mounted within said housing against said sealing means to normally close said housing opening, but being displaceable inwardly through said housing to provide access into and vacuum relief for said duct means.

8. A gas flow system comprising: a pressurized gas source, gas outlet means, duct means for conveying gas from said source to said outlet means, damper means mounted in said duct means for movement between a normally open position in which it permits gas flow through said duct means and a closed position in which it obstructs flow through said duct means, vacuum relief means mounted on said duct means downstream of said damper means, said vacuum relief means including a housing opening into said duct means and a closure member releasably mounted in said housing by resettable latch means normally biasing said closure member to seal said housing opening and actuated in response to a negative pressure in said duct means upon closure of said damper means to release said latch means and said closure member from said duct means and provide vacuum relief for said duct means.

9. A fluid duct comprising tubular wall means defining a fluid passageway and access means in said tubular wall means including a transparent access door providing visual inspection of said fluid passageway and removably mounted on said tubular wall means by resettable spring lock members normally biasing said access door to seal said access means and operable to release said access door to permit access to said passageway upon application of effective inward pressure to said door.

10. A fluid duct as defined in claim 9, comprising handle means on said access door for manually releasing and remounting said access door.

11. A fluid duct comprising wall means defining a fluid passageway and an opening in said wall means, an access door for closing said opening, and mounting means for said access door comprising resettable spring lock members mounting said access door on said duct means in position to close said opening, said resettable spring lock members normally biasing said access door to seal said opening and being actuatable in response to a negative pressure in said fluid passageway to free said access door from its mounting on said duct wall means thereby providing a vacuum relief for said passageway and access to said passageway.

12. A fluid duct as defined in claim 11, wherein said mounting means comprises a tubular housing fixed to said wall means in surrounding relation to said wall opening and formed at its outer end to provide an inwardly directed door frame defining a door opening in communication with said wall opening and said resettable spring lock members mount said access door on said door frame.

13. A fluid duct as defined in claim 11, comprising a tether chain having one end connected to said access door and its other end connected to said duct means to retain the freed door adjacent said wall opening.

14. A fluid duct as defined in claim 11, said access door being constructed of a transparent, shatterproof material providing for visual passageway inspection.

15. A fluid duct as defined in claim 11, said access door being formed by spaced metal walls and a layer of insulation therebetween.

16. A fluid duct access section comprising a tubular wall defining a fluid passageway, an opening in said wall, a tubular housing fixed to said wall around said opening and extending laterally therefrom, the outer end of said housing having an inwardly directed door frame fixed thereto and defining a door opening communicating with said wall opening, sealing means mounted on said door frame inside said housing, an access door, mounting means for releasably mounting said access door on said door frame within said housing in sealing engagement with said sealing means, said mounting means comprising resettable latch means normally biasing said access door against said sealing means and actuated in response to a negative pressure in said fluid passageway to release said door from said door frame for movement inwardly through said housing, thereby providing vacuum relief for said passageway through said door opening.

17. A fluid duct access section as defined in claim 16, wherein said access door is constructed of a transparent, shatterproof material providing for visual passageway inspection.

18. A fluid duct access section as defined in claim 16, wherein said access door is formed by spaced metal walls with a layer of insulation therebetween.

19. A fluid duct access section as defined in claim 16, said mounting means comprising pressure releasable spring lock means.

20. A fluid duct access section as defined in claim 16, comprising handle means connected to said access door and a tether chain to retain said access door in said access section.

* * * * *

UNITED STATES PATENT OFFICE
CERTIFICATE OF CORRECTION

Patent No. 3,782,411      Dated January 1, 1974

Inventor(s) Lloyd Bowman Turner

It is certified that error appears in the above-identified patent and that said Letters Patent are hereby corrected as shown below:

Change Assignee's address from "Columbia" to --Columbus--.

Signed and sealed this 7th day of May 1974.

(SEAL)
Attest:

EDWARD M.FLETCHER,JR.
Attesting Officer

C. MARSHALL DANN
Commissioner of Patents